United States Patent
Ravindran et al.

(10) Patent No.: US 9,880,750 B1
(45) Date of Patent: Jan. 30, 2018

(54) STORAGE ARCHITECTURE FOR STORAGE CLASS MEMORIES

(71) Applicant: Vexata, Inc., Santa Clara, CA (US)

(72) Inventors: Vinodh Ravindran, Sunnyvale, CA (US); Satsheel Altekar, San Jose, CA (US); Ramkumar Vadivelu, San Jose, CA (US); Venkatesh Nagapudi, Milpitas, CA (US); Surya P. Varanasi, Dublin, CA (US); Zahid Hussain, San Jose, CA (US)

(73) Assignee: Vexata, Inc., Santa Clara, CA (US)

( * ) Notice: Subject to any disclaimer, the term of this patent is extended or adjusted under 35 U.S.C. 154(b) by 524 days.

(21) Appl. No.: 14/562,110

(22) Filed: Dec. 5, 2014

(51) Int. Cl.
  *G06F 3/06* (2006.01)
  *G11C 7/10* (2006.01)

(52) U.S. Cl.
  CPC ............ *G06F 3/0613* (2013.01); *G06F 3/065* (2013.01); *G06F 3/0655* (2013.01); *G06F 3/0688* (2013.01); *G06F 3/0689* (2013.01); *G11C 7/1072* (2013.01)

(58) Field of Classification Search
  CPC ...... G06F 3/0613; G06F 3/065; G06F 3/0655; G06F 3/0688; G06F 3/0689; G11C 7/1072
  See application file for complete search history.

(56) References Cited

U.S. PATENT DOCUMENTS

| | | | | |
|---|---|---|---|---|
| 6,820,171 B1 * | 11/2004 | Weber | ................... | G06F 3/0626 711/114 |
| 8,862,832 B1 * | 10/2014 | Cartmell | ................. | G06F 3/067 711/148 |
| 2006/0140114 A1 * | 6/2006 | Cochran | ................... | H04L 1/24 370/229 |
| 2008/0092029 A1 * | 4/2008 | Arakawa | ............. | G06F 11/1076 714/801 |
| 2008/0263289 A1 * | 10/2008 | Hosoya | ................. | G06F 3/0619 711/154 |

* cited by examiner

*Primary Examiner* — Eric Oberly
(74) *Attorney, Agent, or Firm* — Pillsbury Winthrop Shaw Pittman LLP

(57) ABSTRACT

Described is an improved storage architecture. In a particular aspect an improved storage architecture with increased throughput to Ethernet storage modules due to elimination of data path handling from a main control CPU is set forth. Other method and apparatus are described therein, including a scalable Ethernet storage module particularly suited for usage with the improved storage architecture described herein.

16 Claims, 14 Drawing Sheets

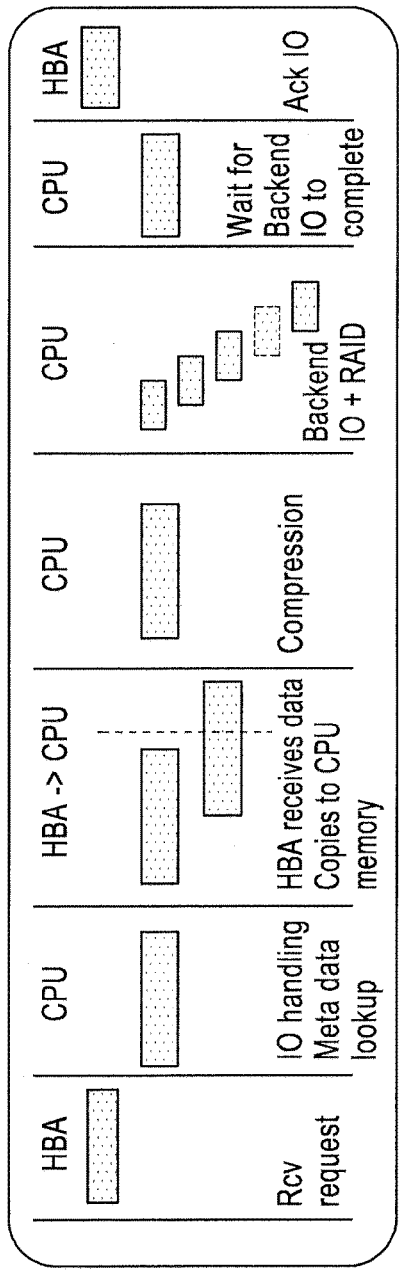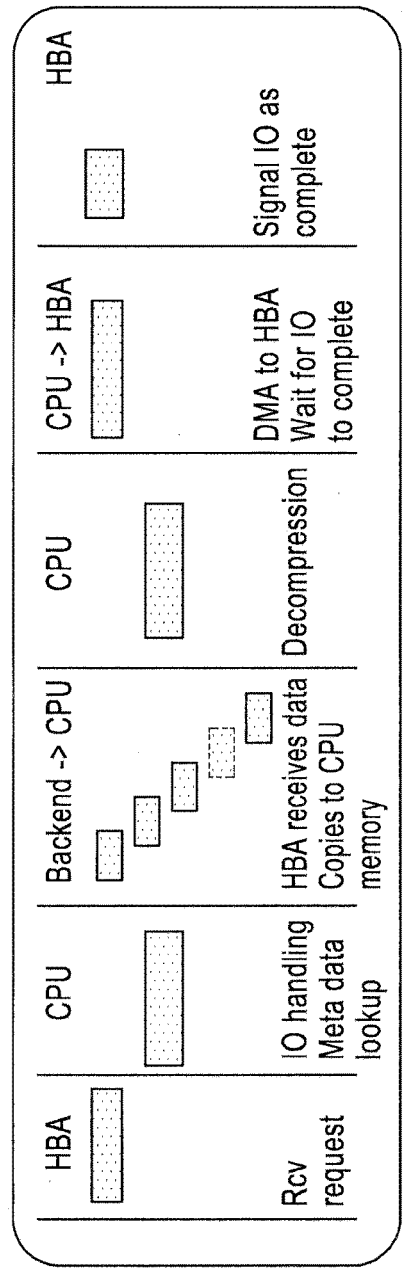
FIG. 3A (PRIOR ART)
FIG. 3B (PRIOR ART)

… …

STORAGE ARCHITECTURE FOR STORAGE CLASS MEMORIES

BACKGROUND

Field of the Art

Described are a method and apparatus for improved storage, and, particularly an architecture that allows for increased throughput, increased scalability, and reduced overhead.

Brief Description of the Prior Art and Observed Deficiencies

Existing storage architectures are designed with hard disk drive ("HDD") (spinning disks) in mind. Storage traffic from the external world comes in to an application server. The application server, which is separate from the conventional storage array and connected to the traditional storage array system through a network, makes an I/O request that traverses the network and terminates in the storage array system through the target mode host bus adapter ("HBA") and is first placed in CPU memory. An example of a conventional storage architecture 100 is shown in FIG. 1. After an I/O is transferred through the HBA 110 and transferred to DRAM memory 120 through the CPU 130, the CPU 130 is responsible for computing RAID, all data efficiency methods and the like before performing I/O to the back-end drives 150 via controller 140, which controller 140 directs data to an appropriate one of the back-end drives 150. The CPU 130 (x86 as an example) is thus tasked with handling the data path (data in and out of the CPU DRAM memory 120), RAID, data efficiency as well as all storage functions like snapshots, thin provisioning, high availability ("HA") and non-disruptive software upgrades ("NDSU"). An existing storage architecture relies on the central CPU 130 (or 2 such CPUs 130 with redundancy) for both data and control path functionality.

Traditional storage SW stacks also perform at least 2 functional I/O operations—one when data is received/transmitted from the external interfaces and a second of I/O to all the backend disks.

Traditional storage architectures also centralize the control processing functions in the CPU 130 of FIG. 1. As part of such an architecture, all the meta-data associated with the data (LUN/LBA to physical storage, snapshots, . . . ) is stored in the CPU DRAM 120, especially when building high bandwidth/low latency systems. An I/O access will first need to perform a meta-data lookup to understand where the data is before accessing the media. Keeping the meta-data in DRAM 120 keeps the slow media access (like flash) to only one lookup. 1) If metadata were kept in flash, then 2 accesses are needed to complete and I/O access. A-lookup metadata in flash and use that result to B-access the physical data. When metadata is held in DRAM, the first access is in DRAM followed by an access to flash. Whilst optimizing for low latency, the difference between DRAM and Flash is that DRAM latency is 10-100 ns and Flash is anywhere between 80 microseconds to 5 milliseconds. However, keeping the meta-data DRAM 120 also means the amount of media that can be put into an array is limited because the DRAM 120 associated with the CPU 130 has a maximum limit in terms of the amount of addressable memory locations that are available.

FIG. 2 illustrates the increase in overhead for node protection in a traditional architecture such as previously described with respect to FIG. 1. Node protection is implemented in one of two ways—1) by replicating the data that is written in one node onto another node, or 2) by using erasure codes to create well known segments of data.

1) Data replication involves writing the data in a single node (100A) and replicating the data (either synchronously or asynchronously) to another node (100B). The main control CPU 130A is responsible for completing the original write operation and completing the operation for the replicated copy at the second node 100B. The CPU overhead to complete this replication operation significant reduces the write bandwidth available to applications trying to write data. Complete replication of the data significantly lowers the data efficiency (2× for replication (to 100B), 3× for triplication (to 100B and 100C)).

2) Erasure coding is an effective method in improving data efficiency and is an alternate to replication. However, writing each of the segments from erasure coding is a complete I/O operation to the new device (100B) and, as such, a write operation from an application server becomes a cascaded write operation before the operation is completed. Erasure coding is demanding on CPUs, as the CPU is responsible for performing the computation pertaining to the erasure code as well as performing the cascaded I/Os to the various nodes that make up the storage cluster and significantly reduces the write bandwidth that is available to applications.

FIGS. 3(a-b) illustrate traditional read/write sequences for a system such as illustrated in FIG. 1. As shown in FIG. 3(a), 1) an I/O initiated by the application is acknowledged by the CPU 130. On writes, a) once the storage array system indicates that it is okay to write, the data (write data in this case) is transferred from the application server that made the request for a write to the storage array, b) The storage array receives the data at the NIC/HBA 110 and DMA's the data into the CPU DRAM memory 120. The CPU 130 computes RAID, performs data efficiency calculations (compression, de-dupe) and starts I/Os to the back-end SSD/HDD 150 through controller 140. A write is not acknowledged to the application until it is written to the SSD 150. In more modern storage arrays, the CPU 130 writes the data into a battery protected DRAM buffer (commonly NVRAM) and copies the same data into the HA CPU (if it exists) before an I/O is acknowledged. Storage arrays store critical data and should protect against loss of data as well as availability under failure. In order to survive a failure, an I/O is not acknowledged to the application server unless data has been written to the I/O and the redundant HA CPU (if it exists) has seen a copy of the exchange or metadata. In systems where there is no high availability guarantee, a copy does not need to be made. However, a system that does not provide high availability guarantees is never properly used to store critical data and is not considered a primary storage array. A read, shown in FIG. 3(b) transfers data in the other direction, using a similar sequence of operations, as shown.

Traditional target stacks perform multiple I/Os per external I/O, and example of which is shown in FIG. 4. An I/O request from an application server is initiated, for example, when an application running on the application server does not find the data it needs in system memory. In this instance, an I/O is issued to read data from the storage array system. If the application system memory is full, a memory flush is also done where data in memory is written to the storage array system to make space. As such, the I/O works from the application server→application server HBA/NIC→either network or direct attach to storage array→storage array HBA/NIC→storage array CPU→storage array backend disk drives. As such, data is handled first by the controller, services are performed on the data and I/O is performed to push the I/O to the backend storage media modules 150 (either SSD or HDD). The backend storage protocol is usually different than the front end protocol so the controller (front end) is responsible for protocol translation in addition to services performed. The application servers communicates to a traditional storage array using SCSI (or an RDMA equivalent like ISER).

FIG. 4 shows a traditional storage stack, which includes the complete datapath for a traditional storage system such as illustrated in FIG. 1. Two observations are made on this: 1) Data movement between the network attached ports and the back-end storage 150 is through the CPU 130, which is a significant bottleneck. 2) The storage stack, for the most part, is built on SCSI. So, data coming from the network ports are stored in the HBA 110, signaled (via interrupt) to the OS, which then using SCSI extracts data from the HBA 110 and transfers it to CPU memory 120. Data from CPU memory 120 is then moved to the back-end storage drives 150 using a SCSI protocol. There are two critical limitations of this approach: 1) Bandwidth bottlenecks with the CPU 130, and 2) the storage stack is typically a SCSI stack from the network→CPU and from the CPU→drives. A big latency penalty occurs as the signaling must go through the storage stack twice.

SUMMARY

In one aspect is described an improved storage architecture.

In a particular aspect is described an improved storage architecture with increased throughput to Ethernet storage modules due to elimination of data path handling from a main control CPU.

In another aspect is described a scalable Ethernet storage module particularly suited for usage with the improved storage architecture described herein.

In another aspect is described a software storage stack with no kernel context switches.

In another aspect is a method of operating a storage architecture with reduced read and write sequence times for reading and writing of main memory data.

In another aspect is a method of operating a storage architecture that stores meta-data in a manner that scales with main memory data.

BRIEF DESCRIPTION OF THE DRAWINGS

These and other aspects and features will become apparent to those of ordinary skill in the art upon review of the following description of specific embodiments of the invention in conjunction with the accompanying figures, wherein:

FIGS. 1-4 illustrate aspects of a conventional storage architecture;

DETAILED DESCRIPTION OF THE PREFERRED EMBODIMENTS

Described herein are a number of different improvements to storage architectures, storage devices, and methods of using the same. It will be appreciated that in this description, reference is made to aspects that are pertinent to the understanding thereof, and that additional specific design and implementation details, which would be apparent in light of the descriptions provided, are not set forth, as to do so would obscure the significant features described herein.

It is also noted that in the descriptions herein, the processing unit (whether SPU or CPU as hereinafter described) are described as handling or performing certain operations. It is understood and intended by this vernacular that a software application exists that contains instructions therein, which instructions are then executed by the processing unit, as is known.

In one aspect is described an improved storage architecture that eliminates data path handling from the main control CPU as conventionally configured and described above. As shown in FIGS. 5(A-B), and in contrast to traditional systems as mentioned above and described with reference to FIGS. 1-4, an improved storage system 500 is shown.

Figure 1:
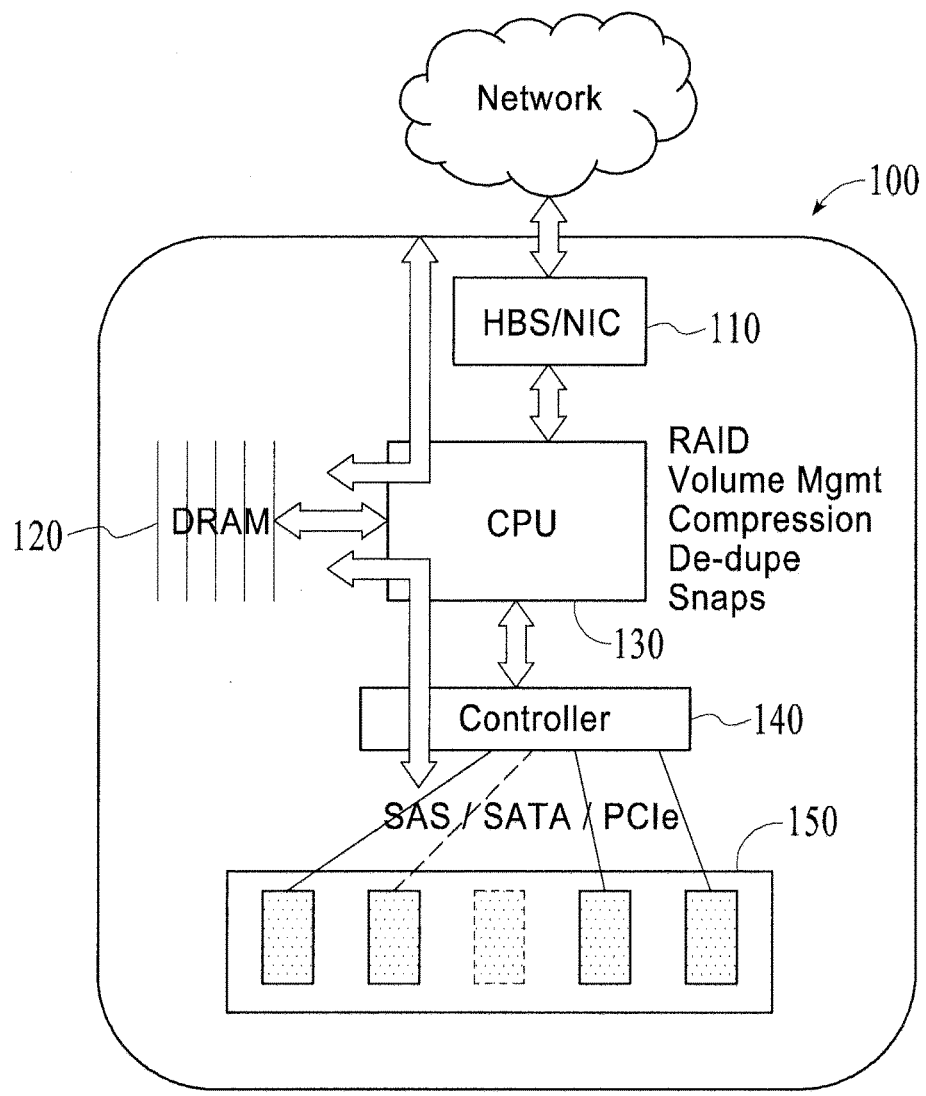
Figure 2:
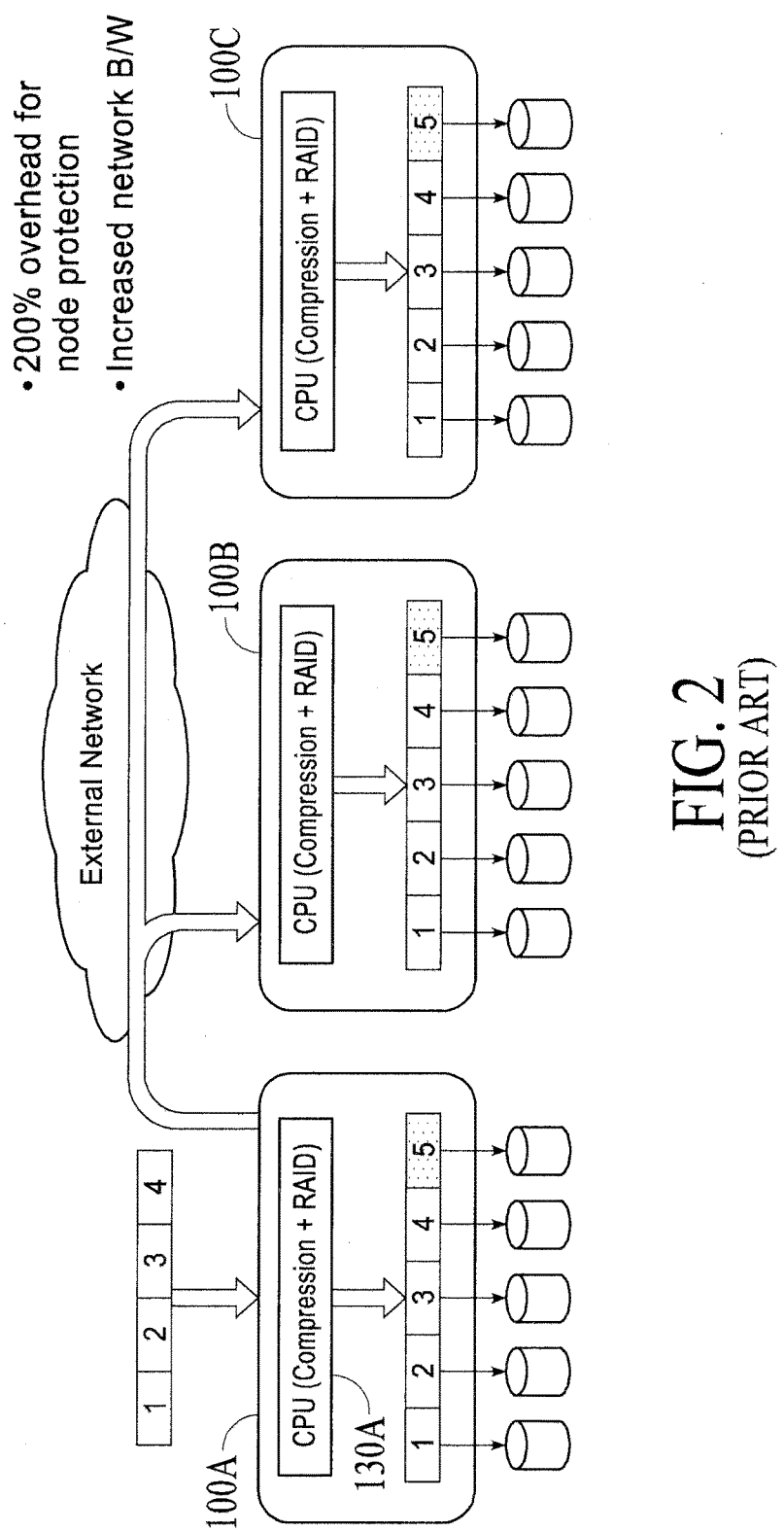
Figure 4:
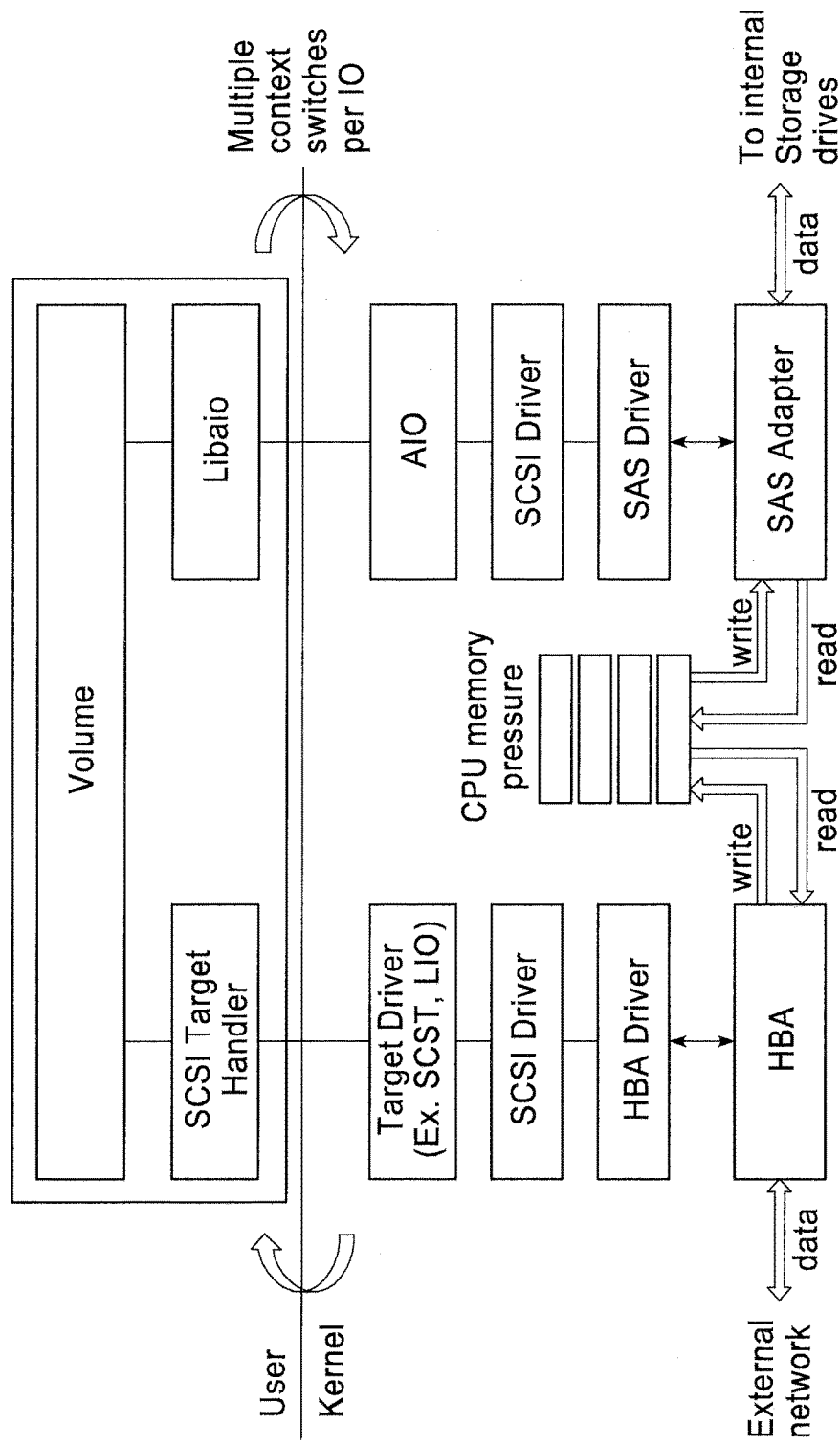
Figure 5A:
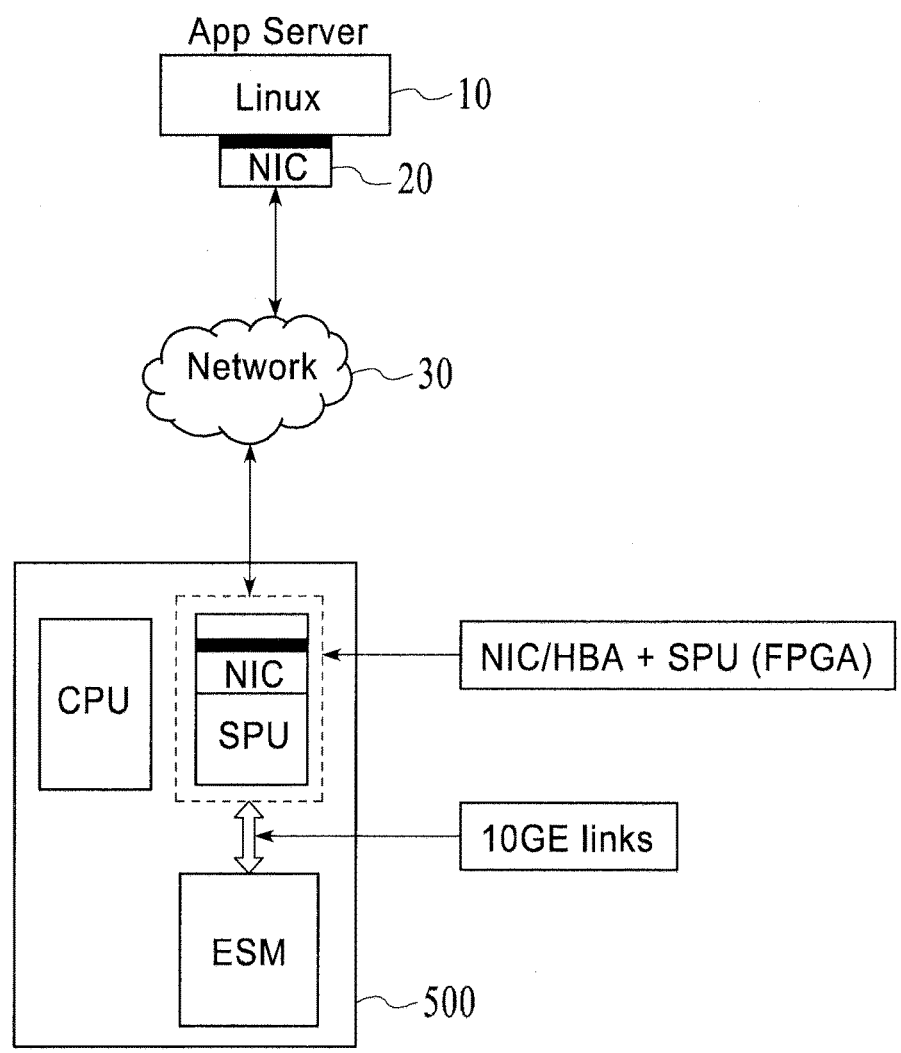
FIGS. 5(A-B) illustrate an overview of a storage architecture according to the embodiments described herein.
FIG. 5(C) illustrates an overview of the SPU according to the embodiments described herein.

As shown in FIG. 5(A), application server 10 needs to send or receive data to the storage system 500, which it does through a NIC 20 and the network 30, though a direct connect without a network can also be implemented. As will become apparent, the data transfer that is done from the application server 10 to the storage system 500 avoids the last conventional storage array CPU→storage array backend, and this data transfer is replaced with SPU→backend, where SPU is the storage processing unit 520. The storage array CPU 530 is responsible for communicating with the application server 10, via the SPU 520, and granting permission to either read or write, and, after granting permission, then waits for the SPU 520 to complete all data transfer before informing the application server 10, via the SPU 520, that the transfer is complete. Thus, the data from the external network (or direct attach from a host) is directed to the SPU 520, through a HBA-NIC 510. The SPU 520 is a HW accelerated engine that performs RAID, implements data efficiency techniques (compute hash for de-dupe, compute data entropy to enable compression) and moves data directly to the backend 550, as described further hereinafter. An example of an SPU 520 that performs within the preferred embodiment is shown in FIG. 5(C), though it is understood that this is exemplary only.

Figure 5B:
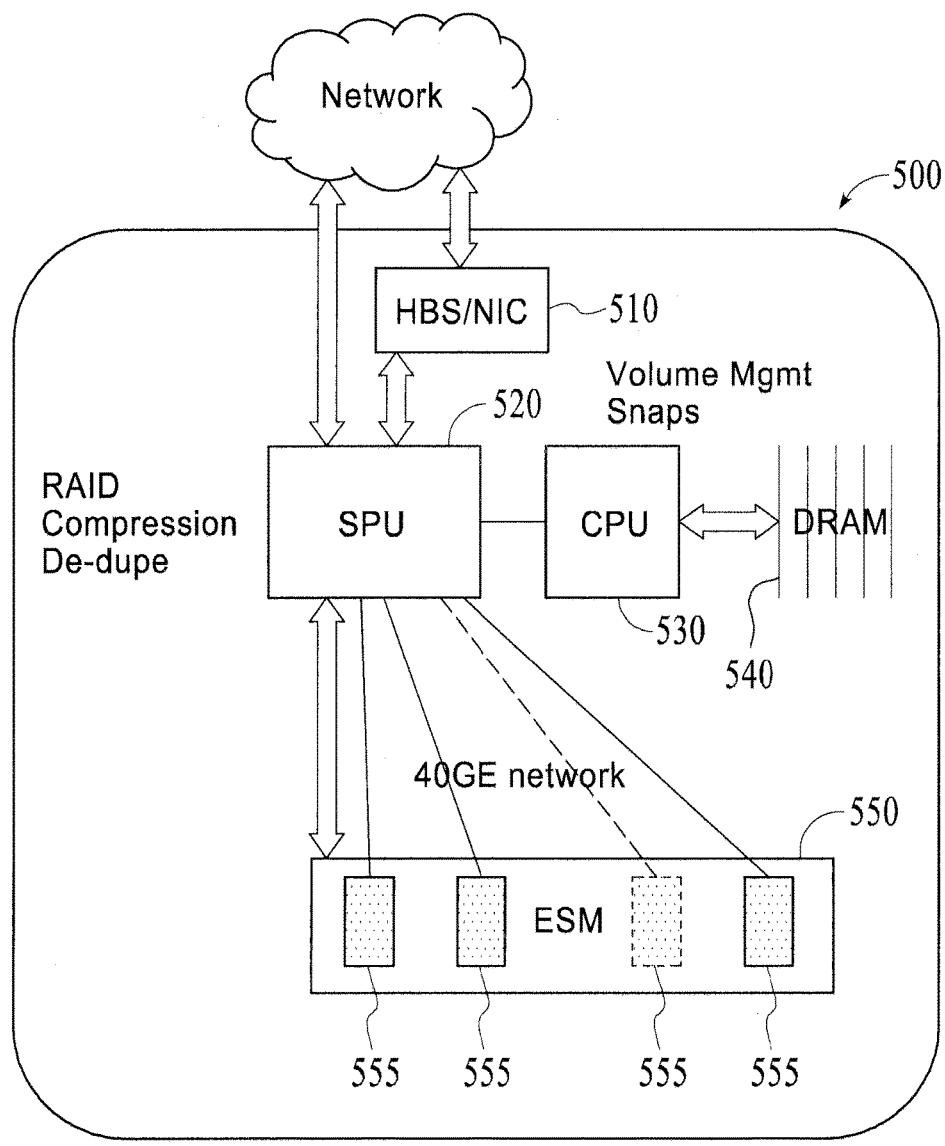
Figure 5C:
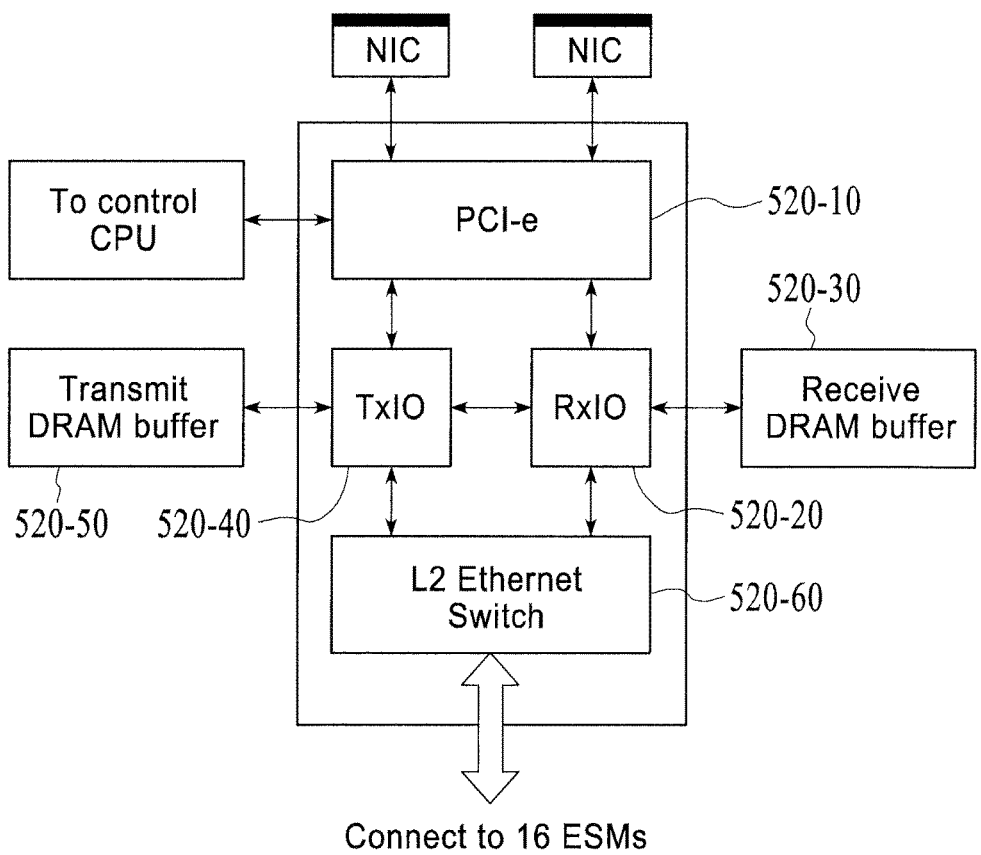

As shown in FIG. 5(C) SPU 520 is the data path acceleration unit in the storage system 500. Data from the external world (i.e., from the application server 10) is received by the SPU 520, initially through a PCI-e interface 520-10 in a preferred embodiment, although other communications interfaces can be used as well.

When the application server 10 wants to write data, a request (command) is issued by the application server 10 to write data. The write command packet is received by the SPU 520 and passed to the control CPU 530 for processing. After processing the command, the control CPU 530 replies to the write command requests, via the SPU 520, to the application server 10. The data is transferred by the application server 10 and received by the receive I/O engine 520-20. The receive I/O engine 520-20 stores the data in the receive DRAM buffer 520-30. The control CPU 530 is notified that data has been received from the application server 10 via the SPU 520. The control CPU 530 issues a command to the SPU 520 to transfer this data to the storage array 550, and in particular the specific ESM 555, as discussed herein. The receive I/O engine 520-20, upon receiving this command, reads the data out of the receive DRAM buffer 520-30 (an external buffer), computes RAID and transmits the data into the L2 switch 520-60. The L2 switch 520-60 uses the destination MAC address to perform an L2 switching function and transmits the data to the particular ESM module 555. The size of the receive DRAM (write) buffer 520-30 determines the number of concurrent (parallel) write transactions that can be executed in parallel. The size of the receive DRAM buffer 520-30 is independent of the amount of flash in the system, and in a preferred embodiment is within the range of 4-8 GB. Data received into the receive DRAM buffer 520-30 is processed (compute hash tag, RAID computation, perform data efficiency computation such as 0-block detection) and then written into the ESMs 555 by SPU520 as described above and herein. The write is only acknowledged as "complete" to the application server 10 when data is written to the ESMs 555.

When an application intends to read data, a request (command) is issues to the storage system 500 to read a certain amount of data. The read command is received by the SPU 520 and passed to the control CPU 530 for processing. The CPU 530 transmits a command to the SPU 520 to read data out of the storage array 550, and a particular one of the ESMs 555. The transmit I/O engine 520-40 on the SPU issues one or more commands to the ESMs 555 to access all the data that needs to be read. As the data is received from the ESMs 555, it is processed and then placed in the transmit DRAM buffer 520-50 (an external buffer). Once all the data is received from the ESMs 555, the transmit I/O engine 520-40 further processes and reads data from the transmit DRAM buffer 520-50 and passes the data to the NIC/HBA 510 (through the PCI-e 520-10) for transmission to the application server 10. The size of the transmit DRAM buffer 520-50 determines the number of concurrent read transactions that can be processed by the SPU 520, and in a preferred embodiment is within the range of 4-8 GB. The size of the transmit DRAM buffer 520-50 is independent on the size of the flash in the system. The read is only acknowledged as "complete" to the application server 10 when data is read by the application server 10.

As to processing in a read request, in a preferred embodiment there are two cases. In a first case of a read of 4 Kbytes (or less): SPU 520 sends a request to the appropriate ESM 555 and waits for the response. If the 4 Kbyte (or less) block is received, the SPU 520 stores the data in the transmit buffer and simply notifies the CPU 530 and moves forward. If the data received from the SPU 520 is in error due to any bit error (corrupted either in the ESM or the network), the SPU 520 starts error recovery. Error recovery includes reading the stripe of 4 KB blocks across which RAID was originally computed. The lost data requested is rebuilt and then transmitted to the application server 10 (via the methods of read below). In a second case of a read of 4 Kbytes (or greater), the SPU 520 requests all the ESMs 555 that contain the 4 Kbyte blocks. The responses from the ESM 555 are stored in the transmit DRAM buffer 520-50 until all the responses are received. When all the data is in the transmit DRAM buffer 520-50, the CPU 530 is notified and the remainder of the read operations proceed forward. In the case of the errors, the procedure for recovery is essentially the same as what was outlined above.

It is also noted that with respect to discovering errors—in SCSI, there is a standard called T10 DIF which is a 16-bit CRC (mandatory) and 2 optional bytes that is stored along with the data. When data is read, this CRC is checked just before transmission as the final check to see if the data is corrupt. In a preferred embodiment, the SPU 520 offloads both the computation of the T10 DIF during write and T10 computation during reads for error detection.

Figure 8:
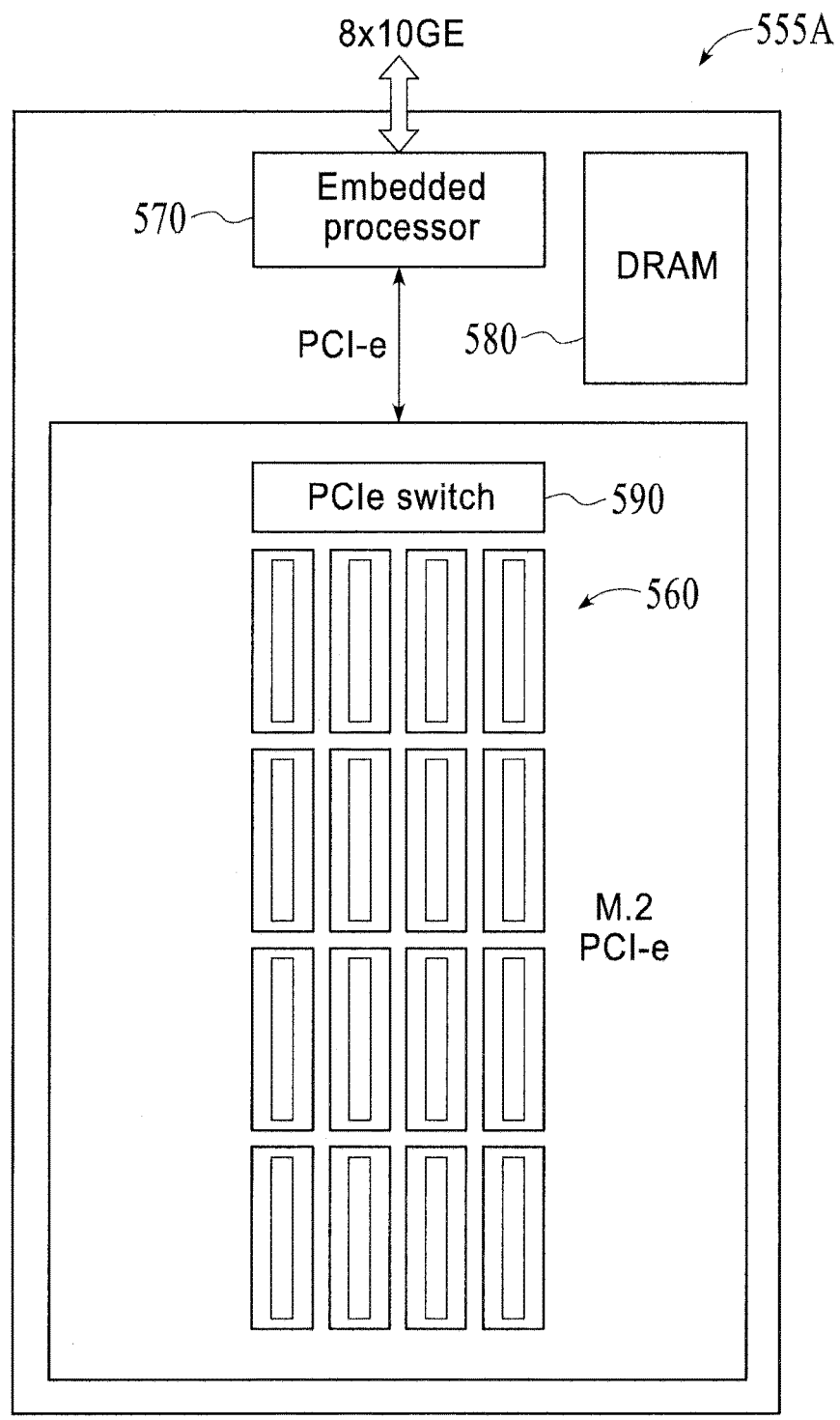
FIG. 8 illustrates a preferred embodiment of an Ethernet storage module according to the embodiments described herein.

The receive and transmit I/O engines 520-30 and 520-50, respectively, work in tandem to implement global garbage collection, compute hash tags as necessary for de-dupe implementation and provide compression acceleration. Compression is implemented in the ESM 555 on the embedded CPUs 570 as shown in FIG. 8. The SPU 520 uses an algorithm to determine if the data is "compressible" and provides these hints to the ESM 555. This is done to reduce the burden of compression on the ESMs 555 in general. The receive and transmit I/O engines 520-30 and 520-50 are also responsible for well-known pattern removal (such as all zero's) and provide data efficiency functions.

Unlike conventionally, the described architecture separates the data and the control paths. As shown in FIG. 5(B) data received from the application server/host 10 comes into SPU 520, which indicates that data has been received to the control CPU 530 (also referred to as just CPU 530), which is an x86 processor in a preferred embodiment. The CPU 530 issues a single command to the SPU 520 that results in RAID/erasure coding, all data efficiency calculations and data being written to the ESMs 555 within the backend 550, as further described herein.

The ESMs 555, as shown in FIG. 8 have DRAM 580 that also contains protected DRAM 580A, described hereinafter, that will maintain power to the DRAM 580A in the event of a loss of power. Therefore, writes to the backend memory array 550 shown in FIG. 5(B) are offloaded to the SPU 520 and written to protected DRAM space 580A in the ESM 555 at extremely high throughputs. Latency is reduced significantly because there is hardware acceleration within the SPU 520 to intensive calculations like RAID/erasure coding, hash tag computation for de-dupe and compression calculation.

The CPU 530 is responsible for storage functionality (snaps, thin provisioning, HA, NDSU, etc.) and handling the control path of an I/O. Consider the process of writing/reading (I/O) to the array 550. The basic steps are 1) application server 10 requests a write of a certain size, 2) Storage array 550 either accepts or rejects the request based on storage capacity by signaling the application server 10, 3) if accepted, the application server 10 transfers data to the storage array 550, and in particular to the protected DRAM 580A within the ESM 555, 4) the ESM 555 writes the data from the protected DRAM 580A to a persistent store (shown as memory 590 in FIG. 8) before acknowledging that the I/O is complete to the application server 10. In the described architecture, the control CPU 530 is responsible for handling steps 2) and 4). The bottlenecks eliminated are the following: 1) CPU DRAM memory is a conventional bottleneck to how much data can be moved into backend storage 550—this is completely bypassed in the architecture, 2) RAID computation is HW accelerated within the SPU520, 3) data efficiency is HW accelerated within the SPU 520. Since data moves directly from the network/external interface all the way to the backend storage 550 without going through the CPU 530, the SW stack of the CPU 530 is architected, as described herein, to optimize control path handling with the lowest latencies and highest throughput.

As is evident from the above, the described architecture and system differ significantly than a traditional system in which the CPU is responsible not only for moving data in & out of the CPU but also with all the control path functionality+front-end 10 handling (to application server), back-end 10 handling (to disk), meta data lookups to DRAM, moving data from HBA→CPU→backend disk (for write) and back-end disk→CPU→HBA (for read), Hash tag computation for de-dupe, compression algorithms (LZS), HA, and the like, as discussed herein.

In the described system, and as shown in more detail hereinbelow, by breaking up the centralized work into multiple workstreams—1) Control CPU: front end handling, metadata lookup, other system manage, HA; 2) SPU: Data path offload; and 3) Embedded processors: compression and drive scheduling, then these different workloads are parallelized. Further, since conventional systems are bottlenecked by CPU memory bandwidth, the manner in which read and write operations occur results in twice the data required by the application server being moved in order to get data into the CPU DRAM and then back out again for both read and write operations. As a result of read operations and write operations contending for the same memory, this results in variable latency, and the CPU is then even further stretched by performing all other operations that are needed to perform I/O, as described above and which include metadata lookup. In contrast, in the system described herein, by dedicating separate read & write buffers, read and write transactions have dedicated memory bandwidth that work with the SPU 520, there is never any contention for memory for concurrent I/O. Thus, the control CPU 530 memory bandwidth is free for meta data lookup and I/O handling.

As will be described hereinafter, the internals of the storage system 500 and the scale-out mechanisms of improved storage architecture results in a massive reduction in latency as compared to a conventional storage system.

Front End+ESM (Storage Module) Interconnect

Figure 6:
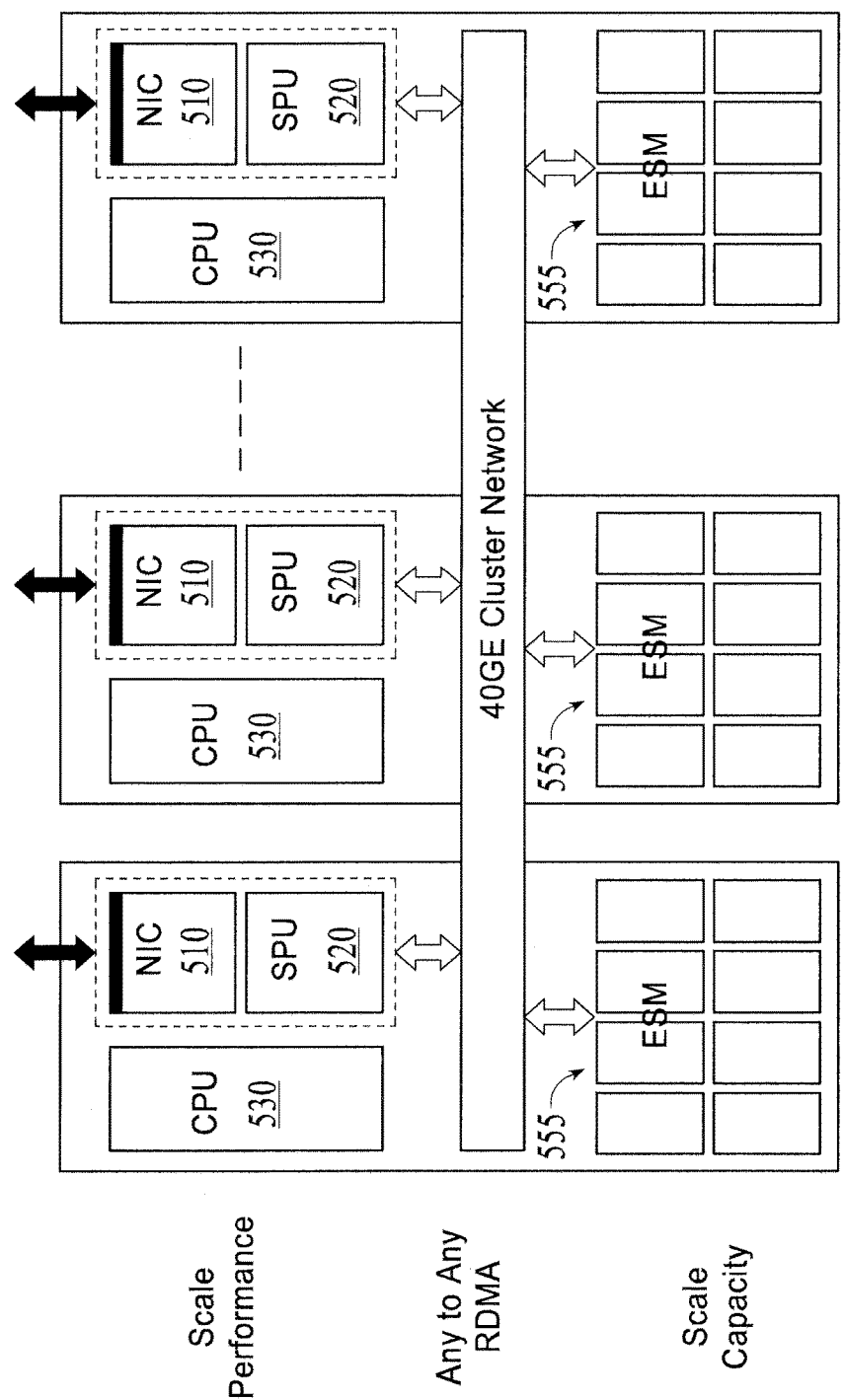
FIG. 6 illustrates scalability of the storage architecture according to the embodiments described herein.

As shown in FIG. 6, the front end of the architecture consists of the CPU 530+HBA-NIC 510+SPU 520 complex that implements control and data path separation. The front ends are connected to the back-end 550 over a network, a 10GE/40GE network in a preferred embodiment, though other networks can be used, and the technology described herein is particularly useful for even faster networks. The network, such as a 10GE/40GE network, is a generic network that is not tied to any storage protocol and provides a direct connection between all the SPUs 520 and the backend storage 550, composed in an embodiment of individual different Ethernet storage modules 555 (ESMs). This direct connection is critical in providing consistent low latency, high throughput access to the entire pool of managed ESMs 555 by any SPUs 520.

In a preferred embodiment, each backend storage 550 has 40GE scale-out ports that are available for connectivity externally. When a storage cluster is created from boxes that contain the described system therein (as shown in the scale out picture in FIG. 6 and FIG. 7(a)), the 40GE ports are connected together. If the cluster is a size of 2 or 3, the 40GE ports can be directly connected to each other. If a storage cluster desired is larger, then the 40GE ports are connected to 40GE Ethernet switches. The 40GE switches will be dedicated to switching traffic between the storage cluster and will be kept isolated. This particular implementation shown in FIG. 6 allows for an HA pool of 10's of Petabytes.

The SPU 520 connects to the backend storage 550 preferably within a single chassis using a network such as a 10GE/40GE network. The SPU 520 also preferably includes 40GE scale-out ports that allow multiple boxes to be connected together. The 40GE ports coming out of the storage array 550 are scale out ports. All the front ends (CPU 530+SPU 520) can see all the ESMs 555 in a cluster in a preferred embodiment. In order to provide such a high visibility in such an embodiment, the ESMs 555 and the front ends (CPU 530+SPU 520) need to be on the same network. The network in a preferred implementation of this embodiment is the 10GE/40GE network. The scale-out ports provide connectivity to other storage boxes that are part of the storage cluster. All ESMs 555 that are part of a storage cluster (now seen as all boxes that have their 40GE scale out ports connected either directly or through a dedicated 40GE switched network) can be directly addressed by the front end.

Another unique part of the architecture is that erasure coding that provides node level resiliency is also done by the SPU 520 without having to get storage CPU 570/control CPU 530 involved. That allows providing node level redundancy at the same throughput as box level redundancy (i.e. RAID). In a traditional architecture, the erasure coded data is transferred between boxes as an I/O operation. The storage node creating the erasure code and distributing the data has to make cascading requests to all the nodes that take part in the erasure code protection. This cascading makes the write throughput of the system much lower than single box throughput.

When multiple boxes are connected using the scale-out ports, there is a completely separate data-path that bypasses all control path CPUs 530 in order to access data. As an I/O access comes in from the external network, the control CPU 530 (as part of control path CPU handling) looks up the LUN/LBA and translates the requests to an ESM 555. The ESM 555 can be in any chassis. As long as the scale-out ports are connected between the boxes that contain the described system therein (as shown in the scale out picture in FIG. 6 and FIG. 7(a)), (either direct connect or through an external Ethernet switch), the ESM 555 is directly accessed by the SPU 520 with any further CPU 530 intervention, further reducing latencies and thus optimizing throughput (by bypassing CPU DRAM memory 540 and avoiding expense protocol translation).

ESM and Scaling Meta Data with Data

Figure 7A:
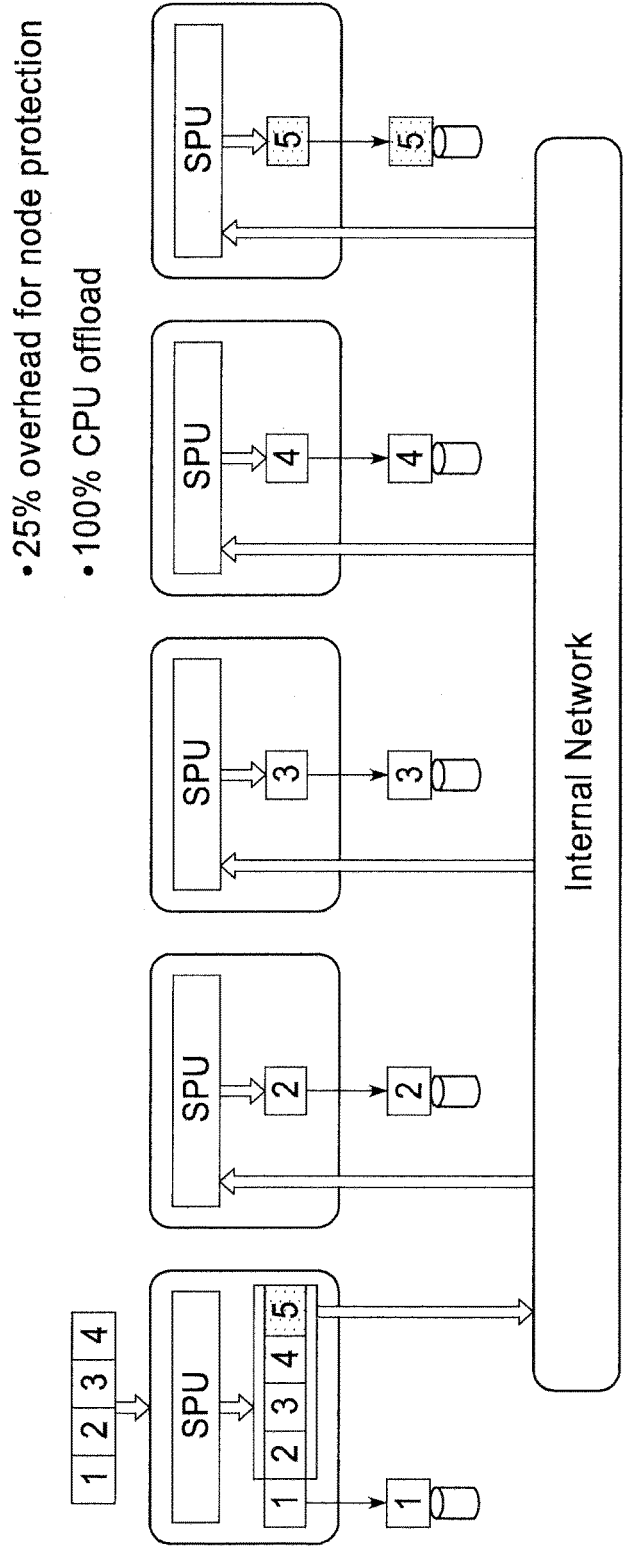
FIGS. 7A-C illustrate details of scale-out of the storage architecture according to the embodiments described herein.

The described storage architecture, as shown in FIG. 7A, embeds the meta data memory along with the media (like flash) in an ESM 555, with a number of ESMs 555 making up the backend storage 550. FIG. 7(A) is an illustration that shows how node level protection of data without CPU involvement (cascading writes) is achieved. At the bottom of FIG. 7(A), data segments 1-4 are written by an application server 10 to the storage node. The storage node is part of a five node cluster. Since the cluster has connected all the 40GE ports, all the ESMs 555 within the cluster are visible to all the front ends (CPU 530+SPU 520). A RAID group can be created is in the storage array cluster where an ESM 555 from a distinct node is part of the RAID group. When the SPU 520 performs RAID calculation and writes the data, the segment of the data is written to each node. The RAID protection for the same segment is written to the $5^{th}$ node. For example, if a node loses power and is permanently lost, and further for example assume it's the node that stores data segment '1'. The availability of nodes 2, 3, 4 and RAID node P means that segment can be recreated by performing a RAID rebuild (another way of saying perform the RAID parity calculation and recreate '1'). The unique part of the described architecture is the RAID operation is the same whether it's internal to a box or distributed amongst boxes, thus giving a storage cluster very high throughput write operations even when configured to perform protection to guarantee node failure resiliency.

Figure 7B:
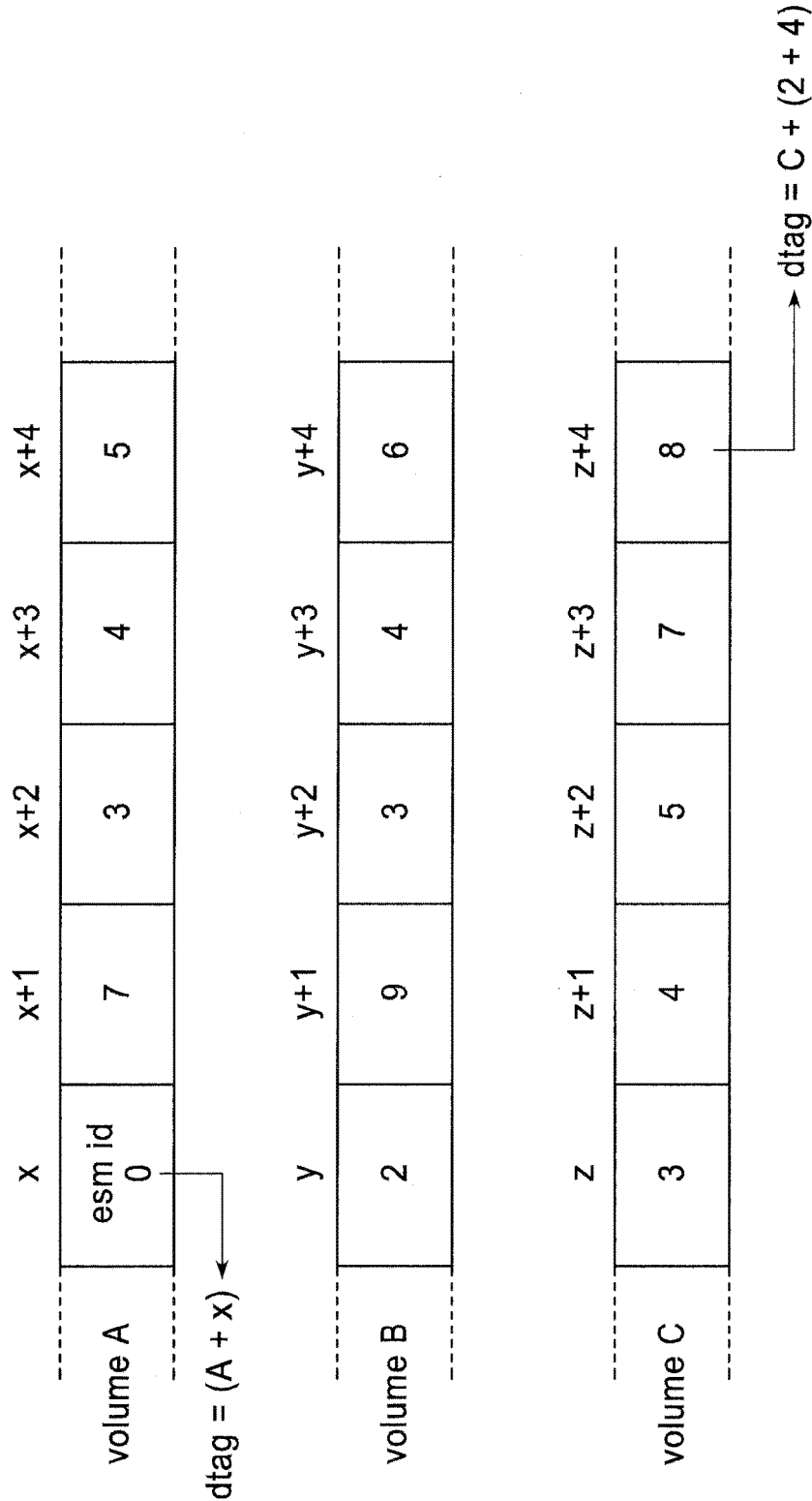
Figure 7C:
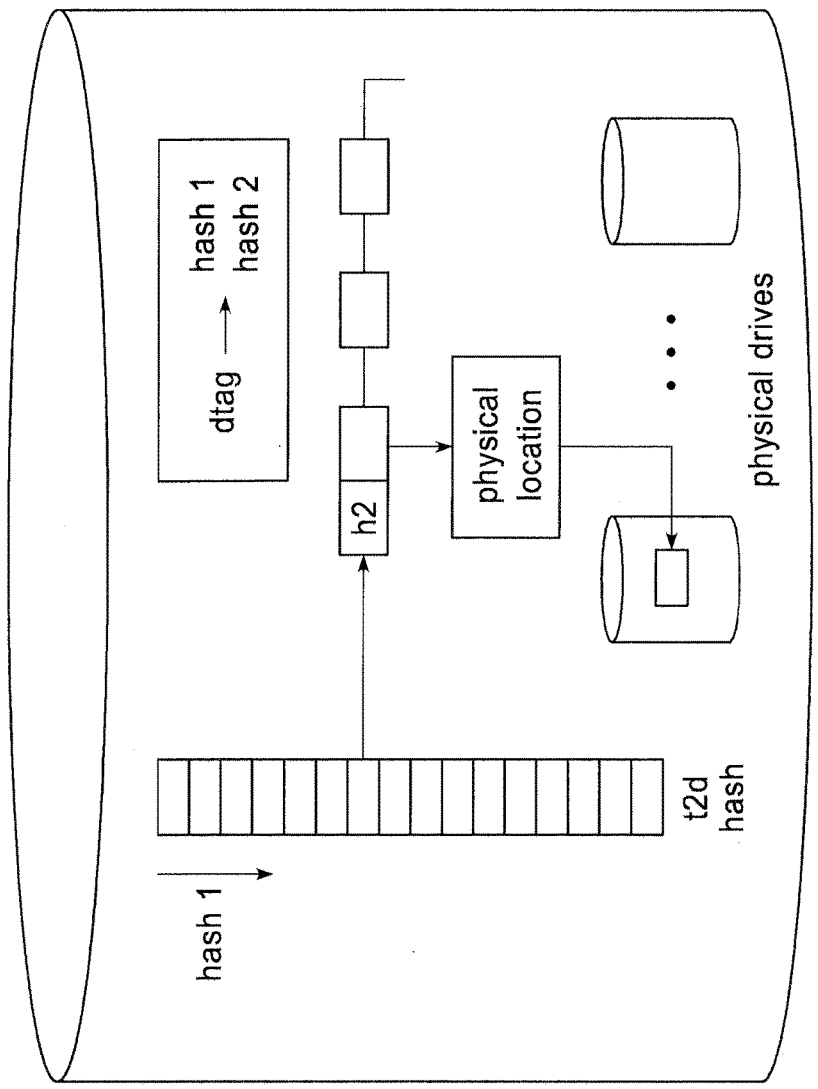

In further detail, as shown in FIGS. 7B and 7C, the distribution of metadata between the control CPU 530 and the ESM 555 is shown. FIG. 7(B) and FIG. 7(C) are related to one another. FIG. 7(C) provides a detail on how meta-data stored—both in the DRAM 540 associated with the CPU 530 and in the DRAM 580 of the ESM 555 shown in FIG. 8 is organized. The two level hash is used to compact memory usage. This is important here because meta-data is stored in the DRAM 580 in the described architecture. While 2-level hashes have been used and are not unique on their own, there usage herein is. As shown, FIG. 7(B) is the organization of a storage LUN (volume) stored in the DRAM 540 and operated upon in the CPU 530. A LUN (ID for a volume called logical unit number) is a unique way to reference the storage that is used by the application server 10. When the application server 10 makes an I/O request, the I/O request is made with a LUN-ID. This LUN-ID is stored in the DRAM 540 associated with the CPU 530. A LUN is made up of one or more LBAs (logical block addresses). The LUN+LBA uniquely refer to a physical data location to which an I/O (read or write) is performed. Typical storage arrays store the LUN-ID and all the LBAs associated with the LUN in a central location. In the described architecture, the LUN is stored in the DRAM 540 associated with the CPU 530. The LBA is stored in the ESM DRAM 580 and organized using the 2-level hash as shown, and operated upon by CPU 570. Each LBA is 8-bytes long. The storage/control CPU 530 stores only the ESM-ID where the LBA is stored. This is a 1-byte value and reduces the pressure on the storage/control CPU memory 540 by ⅞. This reduction in turn allows each storage box (as shown in FIG. 6 and FIG. 7(a)) to keep all the metadata in DRAM memory (either DRAM 540 or DRAM 580 as explained herein) and provide guaranteed low latency access to all data. Since the DRAM memory used is distributed for usage by both the storage/control CPU 530 (or LUN storage) and ESMs 555 (for LBA storage), the architecture is able to leverage the memory of the ESM embedded processors 570 and the storage/control CPU 530 as one very large pool of distributed memory. This is critical in bypassing the maximum DRAM limit on any one CPU.

The application server 10 sees a disk (volume). The volume is represented in the backend storage array 550 with a volume-ID. A volume-ID is further composed on LBAs— in SCSI, the LBA is an 8-byte key. In the described distributed metadata architecture, the control CPU 530 keeps track, by storing in DRAM memory 540, of every volume (LUN) that is exposed to the application server 10. The control processor 530 only stores the ESM-ID which is a unique ID as described above within the storage cluster. ESM 555 where the LBA is stored. Instead of storing the 8-byte value that represents the LBA, a 1-byte value is thus stored. This 1-byte value uniquely identifies the ESM 555 cluster where the LBA is stored. In the ESM 555, two hashes are computed across the volume+LBA key value. The hashes are used to identify uniquely the set of physical data stored in the underlying memory, which in a specific case is preferably a solid state drive ("SSD"). The described system does not have a media limit due to metadata, as the meta data and data scale, in what is referred to herein as linearly, but is in some substantially consistent manner between meta data and data that increases in amount. This scaling enables massive densities in a single back-end storage system 550, which are also scalable as described herein.

All the LBA information and access to the physical data is stored within an ESM 555. This is called the "metadata" for the data that is stored in the ESM. The system meta data is organized in 2 levels. The 1st level is in the front end that contains the CPU 530 and the SPU 520 and carries only run time related data. The $2^{nd}$ level is the persistent metadata (that maintains the context of the storage used) is part of the ESM metadata and 1) scales with storage, 2) persists with the ESM 555 and thus moves along with the data. Since the metadata stored in DRAM 558 scales with the ESM 555, the described architecture provides the basic method to scale metadata along with the data. In contrast, existing storage architectures hold the volume and all the LBAs that make up the volume either in the front end CPU 530 or any solid state drive or hard disk drive (not shown) that is part of the front end controller CPUs 530 memory 540.

FIG. 7C is a depiction of how meta data is stored in ESM memory 555, and particularly in the DRAM 580 as shown in FIG. 8. As discussed earlier, a LUN (logical unit number used interchangeably as a volume) consists of many LBA. Each LBA in a flash based system references a 4K section in flash drive. LBA is an 8-byte wide field in SCSI. Thus, 8-bytes of data are used to point to a physical 4K byte location. As the amount of flash memory 560 from FIG. 8 grows in an ESM 555, the amount of 8-byte metadata that needs to be stored in DRAM memory 580 grows as well and can place a limit on how much flash memory 560 can exist in an ESM 555. As the architecture described herein is designed around the core principles of high throughput and consistent low latency, in order to achieve these targets, meta data that is needed to access the physical data needs to be stored in DRAM for the DRAM memory 580. The direct implication is that ESM DRAM 580 demands increase as capacity of flash memory 560 increases in the ESM 555.

In order to reduce the pressure on DRAM memory 580 used by meta-data, the described system implements the 2-hash bashed meta data compression scheme, mentioned herein and also described as follows—

1) Two hash tags are computed from the 8-byte LBA. The first hash tag is 22-24 bits long. The second hash tag is 12-16 bits long.

2) The first hash tag defines a bucket. In the bucket, the $2^{nd}$ hash tags are stored.

3) When an LBA is written to an ESM, both hash tags are computed. Checksums used for the hash tags are well known and provide great distribution among the checksum space (so even distribution and low collisions). A good example of a 2-byte hash tag is CRC16. Other commonly used hash tags in de-dupe are 32-byte MD5 tags), and others can be used that provide the best distribution and lowest probability of collision.

a. The first hash tag computed index the bucket where the compression algorithm looks to see if the $2^{nd}$ (smaller) hash tag exists.

b. If the $2^{nd}$ hash tag does not exist, then the 2 hash tags are stored. This is a unique identifier to an LBA.

c. If the $2^{nd}$ hash tag exists, the hash tags are not unique and there is a collision. In such a case, the 8-byte LBA is stored.

When an LBA needs to be read, a lookup is performed to access the bucket (using the first hash tag) and an exact match comparison of the $2^{nd}$ tag. The result is either an exact match (unique $2^{nd}$ tag) or the actual LBA is stored (because of collision). The computation of the 2 hash tags is performed by the SPU 520 and supplied along with the data command (either read or write) to the ESM 555. The ESM 555 is responsible for lookup and retrieval of data (in case of read) or updating the tables with a new hash tag (or the full LBA) in case of writes. The SPU 520 performs this operation as part of the data path acceleration function.

The compression scheme reduces the 8-byte LBA number to a 32-36 bit double hash tag value that is used to access the physical data in the vast majority of cases. This compression algorithm results in about 44% savings in DRAM usage. This is critical as it allows for very large ESMs 555 and storage of all the meta data in DRAM memory.

In this context, it is within the scope described herein that the selection of the 2-hash tags as well as size of each has tag will vary. In preferred embodiments, Hash-tag1 will vary between 22-24 bits and hash-tag2 will vary between 12-16 bits.

It should be noted that above-described, if designed for high performance, all the metadata is held in DRAM, as described. If, however, the system is not designed for high performance, the metadata is typically held as a combination of memory, either SSD or HDD. In either embodiment, storage architectures organize metadata in a central place—be it DRAM or a combination of DRAM+SSD/HDD. If the system is a high performance system, the amount of DRAM that can be effectively supported by the x86 eventually limits the scale of the system. Conventional schemes where several CPUs are bound together through a shared fabric is a typical way to scale the DRAM needs of the system. This is both expensive (more CPU power than the system needs primarily to get DRAM) and very power hungry (x86 CPUs are very power hungry). If multiple CPUs are needed to support the DRAM necessary to store metadata for the system, the system is significantly overprovisioned when there at lower storage capacities with an upper bound of scale. In contrast, the described architecture bypasses the x86 DRAM limitation by included metadata in every ESM 555. Metadata scales linearly along with storage in the ESM 555.

As was mentioned above, described system contains protected DRAM in the ESMs 555. In a preferred embodiment, this system includes two large capacitor FRUs (field replaceable units) whose sole purpose is to power DRAM upon a loss of power. When an application server performs a write operation, data transferred from the application server to the storage array 550 (via the SPU 520), and this data is written first into this protected DRAM that is part of the ESM 555 to which it is sent. Data received in the ESM 555 and stored in protected DRAM are acknowledged as complete to the SPU 520. The result is that the application server is able to perform writes at DRAM like rates and latencies until the protected DRAM is full (there is about 32 GB of write buffer per system in a specifically preferred embodiment). The use of the two large capacitor FRU's and not batteries (like Lithium Ion) is advantageous as UPS/Battery backed up devices are known to fail frequently and have a lifetime of about 500 power cycles (500 times of power on/off before they fail) whereas capacitors have an nearly infinite life compared to batteries (10K+power on/off cycles).

Scale-Out and AnyRAID

As mentioned before, every front end controller SPU? 520 can see the entire set of ESMs 555 across a set of nodes connected via their scale-out ports. One of the ESM's 555 is illustrated in FIG. 8 as ESM 555A. Using 16 of the ESMs 555A as shown results in a storage array 550 that has 16 M.2 Drives and 16 ESM/Chassis. There is not, however, a specific limit on how many M.2 drives can be use within an ESM, and in fact there is not limit. Also, there are smaller form factors that are available (M.2, mSATA and cellphone type commodity drives like UFS), and any of these can also be used to store the data. Having the ability to have a large number of these smaller drives and scheduling I/O to and from these large number of drives is a significant enhancement achieved by the system described herein. Because there are so many drives in the system, one core aspect of the scheduling is to use each drive as little as possible—meaning perform the fewest possible read and write operations to a given commodity SSD drive. By spreading the data across many of these drives and parallelizing operations, the architecture keeps latency very low, power very low and keeping bandwidth very high (aggregating the bandwidths across a very large number of smaller drives.

The ESM 555A includes the main data memory 560, which is preferably a completely solid state flash memory in one preferred embodiment, with other embodiments described hereinafter. Also included is a processor 570, shown as an embedded processor, which interfaces with the internal network (shown as 8×10GE in this embodiment) and the PCIe switch 590 to which is connected the main data memory 560. The 8×10GE is achieved, as explained and summarized again, in that the 40GE ports exposed externally from a single storage array are scale-out ports. Every storage box has exposed scale-out ports. A storage cluster consists of storage boxes whose scale-out ports have been connected together—either directly for a few (2-3) boxes of via Ethernet switches (40GE)]. Further, DRAM 580 is shown, into which the meta data is written, as described above.

When an application server 10 performs a write operation, data transferred from the application server to the storage array 550 (via the SPU 520) is written first into DRAM 580A that is part of the ESM 555. Data received in the ESM 555 and stored in DRAM 580A are acknowledged as complete to the SPU 520. The result is that the application server 10 is able to perform writes at DRAM like rates and latencies until the DRAM is full (there is, in a preferred embodiment, about 32 GB of write buffer per system).

In separate embodiments, rather than the main data memory 560 being all solid state flash of the same type for each ESM 555, certain ESM 555 can contain only solid state flash memory for the main data memory of one type, whereas other ESM's 555 can contain only solid state flash memory of another type. As still another embodiment, certain of the ESM's 555 need not be solid state flash memory at all, but can be a HDD.

It should be noted that the system herein was designed, in part, considering that NAND flash has latencies in the ~80 us range on reads and existing architectures are in the ~500 us-1 ms range. As such, conventional architectures did not accommodate such reduced NAND flash latencies. The architectural change as described herein thus allowed NAND flash capabilities to be exposed to the application. There is also recognized an evolution from NAND to newer persistent storage class memories (MRAM-magneto resistive RAM technology, phase change memories etc) that are emerging, which devices offer latencies in the 1-2 uS. The described new storage architecture takes advantage of and exposes the capabilities of these new devices to the application by changing the architecture to eliminate latency and significantly improve throughput. So, while the system as described herein is optimized for solid state storage, be it NAND or the newer storage class memories, though it can be used with other types of memories as well.

It is also noted that each ESM 555 can be of a different type and a different size and can be in the system at the same type, a RAID set (a collection of ESMs 555 that form a protected storage entity) must be identical. So, a storage box can have 4 RAID sets—each of a different type and size but each set needs to be identical.

In relation to scalability, one of the important parts of the architecture is that every SPU 520 is directly connected as described above over a shared Ethernet storage fabric to every ESM 555 that is part of the scale-out cluster. Thus, SPUs 520 in any front end can access ESMs 555 anywhere across the storage cluster. SPUs 520 can compute RAID (within a node or across nodes) and access data across a cluster bypassing the front end CPUs 530. This forms the basis for the consistent, high throughput and low latency access across a shared pool of storage.

Since every SPU 520 can see all the ESMs 555, a RAID group can be defined that spans all the boxes within a scale-out set, as described above. The RAID group can be constructed with an ESM 555 from each chassis being part of it. An SPU 520 can perform all storage services at very high throughputs whilst reducing the RAID overhead to 1.25× for chassis protection. Typical architectures require replication to protect against chassis level failure which is a 2× or 3× overhead.

Storage SW Stack Innovations

Figure 9:
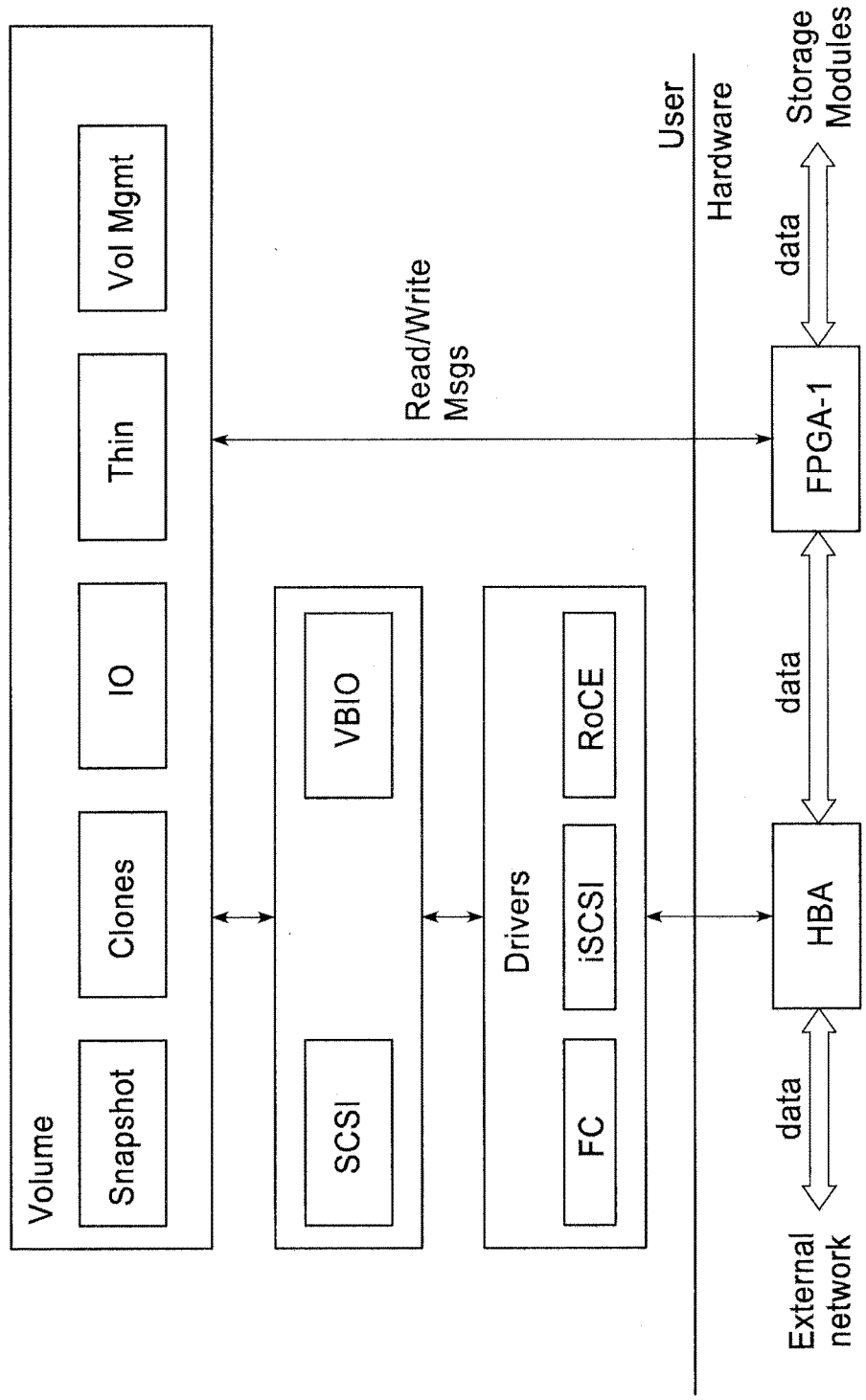
FIG. 9 illustrates a preferred embodiment of a software storage stack according to the embodiments described herein.

In the described architecture, shown in FIG. 9, the controller 530 is only responsible for front end I/O handling. An I/O received from the external network is stored in the SPU 520 and the control information (LUN & LBA) is sent to the controller (x86) 530. A quick lookup identifies the ESM 555 where the I/O needs to be performed. From this point, the SPU 520 accelerates all the data path functions until the I/O is completed. As shown, there is a control and data plane separation as has been discussed herein, as well as no kernel context switches, as has also been discussed herein. I/Os that go through the kernel are subject to the I/O scheduling algorithms in the scheduler, as are known.

Flash drive performance is very dependent on the number of commands (both read and write) queued into the flash drive, the bandwidth and size of the write commands and the overprovisioning (OP) of the device.

As has been described above, the system 500 is optimized for throughput and latency. In order to achieve both, it is preferable to characterize the specific flash drive being used to determine an optimum over-provisioning ratio and thereby arrive at an aggregate read+write throughput and the lowest latency. In this characterization, since the optimum overprovisioning ratio is very dependent on the specific flash drive type, a flash drive 580 as shown in FIG. 8 selected for use in the system 500 is first qualified to determine an ideal over-provisioning ratio. In addition, this flash drive 580 is also characterized for the best possible read+write aggregate throughput. The numbers determined through the characterization are used when scheduling I/O within the ESM 555.

For example, a selected flash drive 580 was determined to perform best (say 120uS average latency) when writing 512 KB blocks and writing at a write bandwidth limited to 80 MB (megabytes)/s and a queue depth of 10. At this queue depth, assuming that the selected flash drive 580 can read at 190 MB/s, with a queue depth of 10, the simultaneous read+write BW is 80+190=270 MB/s. These values are used by the scheduling algorithm to schedule I/O to any one of the individual flash drives 580 that are part of an ESM 555. An important aspect of this is the strict bandwidth control into each and every flash drive 580 in an ESM 555 to guarantee a given throughput and latency. If the write bandwidth of the queue depths are exceeded, the system will not be able to provide consistent, low latency and high throughput.

In the example above, a single drive can achieve 270 MB/s. With 16 drives in an ESM 555 to make up memory 560 (as shown in FIG. 8), each ESM 555 is capable of operating as a 4.3 GB/s (Gigabytes/second) drive. With 16 ESM's 555 in the system 500, the system 500 has available a raw bandwidth of 68.8 GB/s.

It is also noted that flash is a storage media where a physical location can only be written once in a device. To write it again, the physical location has to be erased (also referred to as program erase or P/E) before a write is possible to that location. Flash is characterized in terms of P/E cycles. Flash that is used continuously has to be erased before new writes can occur causing "wear" on the flash. Over time, all the P/E cycles available to the device are exhausted and flash fails. Erase cycles happen over wear large granularity (like 1 MB chunks—varies with process, manufacturer) vs writes (which can happen at sizes anywhere from 512 bytes to 1 MB). When trying to schedule erases in flash, data within a 1 MB chunk that is still active has to be moved to a new location so an entire 1 MB can be "freed" for writing again. This process of moving data from partial "erase" blocks and moving them to a common block is known as garbage collection in flash, and referred to as such herein and provides context to the descriptions herein and below.

In a preferred embodiment specific implementation, there are 256 drives, 16 within each ESM 555 as noted above. Part of the scheduling of I/O also involves the concept of wear leveling. In wear leveling, the flash within the box needs to wear evenly to avoid one particular flash drive from wearing too soon and causing premature failure. In order to provide even wear leveling, ESMs 555 collate all the writes received and schedule writes across all 16 ESMs 555.

In order to provide wear leveling, the ESM 555 implements scheduling algorithms that try and provide global wear leveling. The ESM 555 manages the state of all the live data in the drives. As drives get written to, garbage collection becomes necessary. The ESM 555 implements garbage collection so that data movement can occur from one drive in the ESM 555 to another drive in the same ESM 555 during the garbage collection (CC) process in order to balance drive use, maintain similar free space within a drive and even out wear.

Wear leveling optimization is also provided across ESMs 555—during the write process, data is moved amongst ESMs 555 to maintain even wear across the ESMs 555 that comprise the system 500.

As is apparent from the above, the global state of flash usage is maintained by the control CPU 530. The CPU 530 needs the information to process I/O commands received from the application server 10. The physical mapping of what block of flash is used and not used is preferably maintained in the ESM 555.

The ESM 555 thus includes the scheduling algorithms that define how a drive is used (read, write, OP) based on characterization. During the course of operation, data that was previously written by the application server 10 is re-written (an updated to a table that was written before for instance). Re-written data is written to new locations in the flash memory 560 and the old data is marked to be "freed up" for additional writing. This processing of reclaiming old (stale) data is, as with all other current flash arrays, using GC algorithms in the CPU 530 for global wear leveling across ESMs 555 and GC algorithms in the CPU 570 within an ESM 555 to wear level evenly inside an ESM 555.

Predictable, consistent low latency is critical in an application. In any system, including the present one, the I/O scheduling algorithms add variable latency to a path. In addition, newer versions/releases of whatever operating system is in use may have made changes to scheduling which requires even more characterization and re-tuning to hit consistent delays (if at all). To counter these issues, the present system performs in user space is to eliminate all the variable delays in the system and provide an extremely consistent latency path through the software. This is possible when context switches are avoided to the kernel where there is significant delay variability.

Figure 10A:
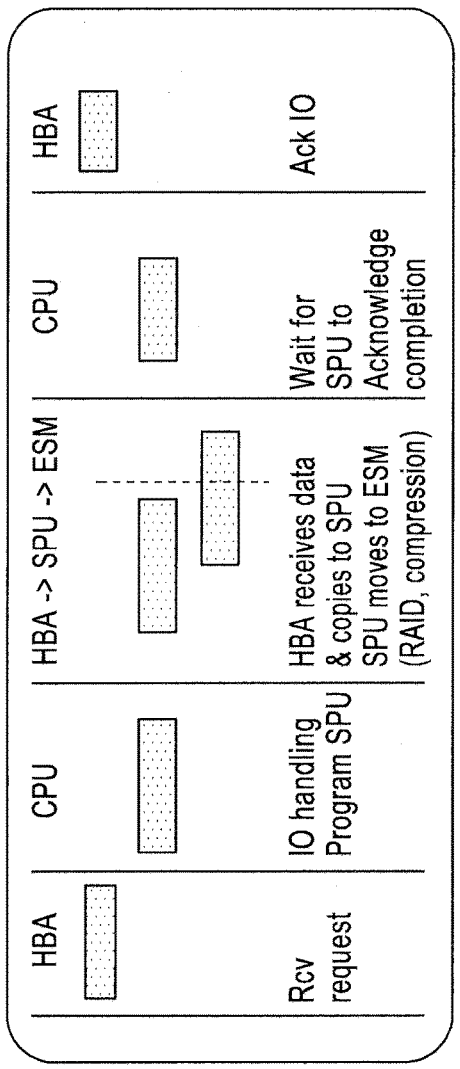
FIGS. 10(*a*)-(*b*) illustrate preferred embodiments of write and read sequences of an Ethernet storage module according to the embodiments described herein.
Figure 10B:
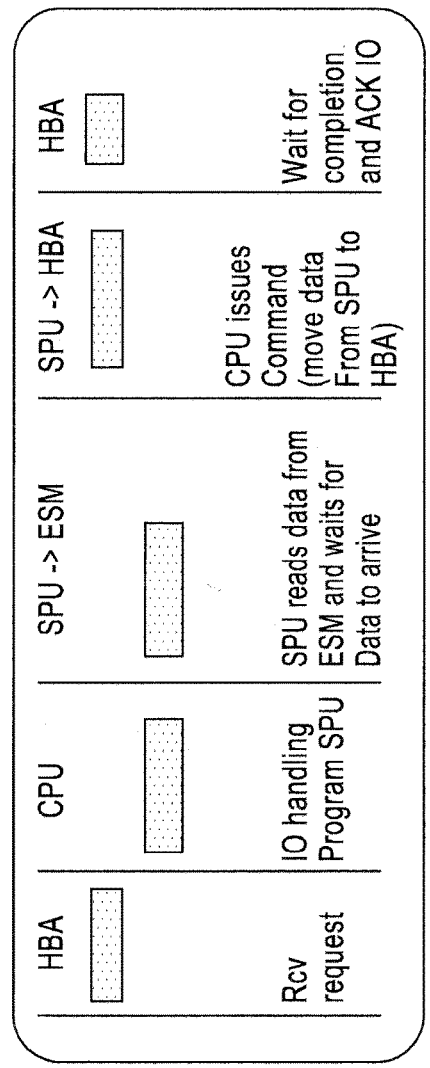

An example of the write sequence is shown in FIG. 10(*a*), and a read sequence is shown in FIG. 10(*b*). The described storage stack avoids kernel context switches and performs I/O from user space. The traditional storage stack and associated latencies in the kernel are completely avoided.

Stack Details

In the described architecture, such as shown in FIG. 5(B), a network to CPU path does not exist. The data from the network first goes to the SPU 520. The CPU 530 polls the HBA 510 for status changes (and bypasses all interrupt related latencies). The CPU 530, on an event change discovered through polling, bypasses the kernel (to avoid costly context switch related latencies) and goes directly to user space. Functions like I/O handling or meta-data lookup are done in user space and command is issued directly from user space to the SPU 520 to move data (again bypassing kernel context switches). The SPU 520 accelerates the remainder of the function and signals the CPU 530 (via register changes). The CPU 530 is polling on these registers and avoiding any latency due to interrupt propagation and context switches.

In another aspect, software that is used within the storage system 500 is architected to make very efficient use of multiple core processors, such as CPU 530, SPU 520, and CPU 570 in each ESM 555. Software fast-path processing is broken into multiple pipeline stages, where each stage is executed on a separate processor core. Each stage of the SW fast path is responsible for a specific function of the code. Software design partitions data structures such that each pipeline stage can independently execute with no lock serialization. The processor core for next stage of pipeline is chosen based on affinity of data partitions. This enables full concurrent processing power of multiple cores for chosen stages. An efficient inter-processor core messaging between these pipelines is built using a multi-producer lockless queue primitive.

In contrast, traditional concurrent programming involves spawning a large number of parallel threads on multiple processors. Locks are taken to either when there multiple threads contest for a shared resource. Lock contention by threads introduces variable latency into the SW stacks.

The invention has been described in terms of particular embodiments. Other embodiments are within the scope of the following claims. For example, the steps of the invention can be performed in a different order and still achieve desirable results.

The invention claimed is:

1. An apparatus for writing of network digital data from and reading of buffered digital data to a network comprising:
    a backend storage array that includes a plurality of independently addressable backend storage devices into which backend storage array digital data is written and the backend storage array digital data is read from, each of the independently addressable backend storage devices including:
        a backend storage device processor through which the backend storage array digital data is written and read;
        a data memory coupled to the backend storage device processor for storing the backend storage array digital data; and
        a backend DRAM memory, different than the data memory, coupled to the backend storage device specific processor for storing meta data associated with the backend storage array digital data;
    a DRAM memory, different from the backend storage array, into which hash meta data for addressing individual ones of the plurality of independently addressable backend storage devices is written and read;
    a storage processing unit that:
        receives the network digital data from the network and stores the network digital data as buffered write digital data in a write data buffer;
        writes the buffered write digital data as the backend storage array digital data to one of the plurality of independently addressable backend storage devices of the backend storage array upon receipt of a write control signal and a particular hash meta data; and
        reads the backend storage array digital data from one of the plurality of independently addressable backend storage devices of the backend storage array as the buffered digital data and stores the buffered digital data in a read data buffer upon receipt of a read control signal and another particular hash meta data from the central processing unit; and
        transmits the buffer digital data from the read data buffer to the network;
    a central processing unit that is coupled between the DRAM memory and the storage processing unit for writing the hash meta data to the DRAM memory, reading the hash meta data from the DRAM memory and providing the read control signal and the write control signal;
    wherein the storage processing unit is not configured to write to the DRAM memory and read from the DRAM memory without transmission through the central processing unit;
    wherein the central processing unit is not configured to write the backend storage array digital data to the backend storage array and is also not configured to read the backend storage array digital data from the backend storage array; and
    wherein the storage processing unit and the central processing unit are configured to eliminate data path switching by the central processing unit.

2. The apparatus according to claim 1 wherein the backend storage array digital data and the meta data scale together within each of the plurality of independently addressable backend storage devices.

3. The apparatus according to claim 2 wherein the central processing unit operates with software storage stack that has no kernel context switches.

4. The apparatus according to claim 3 and further includes a host bus adapter disposed between the storage processing unit and the network, and wherein:
    the central processing unit polls the host bus adapter, via the storage processing unit, for status changes;
    the central processing unit, upon discovering a status change bypasses a kernel of the software stack and operates within a user space; and the central processing unit, from the user space, issues a command to the storage processing unit to move the network digital data from the network to the backend storage array.

5. The apparatus according to claim 1 wherein the central processing unit operates with software storage stack that has no kernel context switches.

6. The apparatus according to claim 5 and further includes a host bus adapter disposed between the storage processing unit and the network, and wherein:
the central processing unit polls the host bus adapter, via the storage processing unit, for status changes;
the central processing unit, upon discovering a status change bypasses a kernel of the software stack and operates within a user space; and
the central processing unit, from the user space, issues a command to the storage processing unit to move the network digital data from the network to the backend storage array.

7. The apparatus according to claim 1 wherein the data memory is made entirely of solid state flash memory in each of the independently addressable backend storage devices.

8. The apparatus according to claim 1 wherein the data memory is made entirely of solid state flash memory in at least some of the independently addressable backend storage devices.

9. The apparatus according to claim 1 wherein the data memory is made entirely of solid state flash memory in at least some of the independently addressable backend storage devices and wherein the data memory is made entirely of another type of memory other than solid state flash memory in at least others of the independently addressable backend storage devices.

10. The apparatus according to claim 1 wherein the storage processing unit executes instructions that also perform RAID and compression operation.

11. A method of writing digital data to a storage array system, the method comprising the steps of:
receiving a write request at the storage array system, the storage array system including a storage processing unit and a central processing unit;
determining, using the central processing unit, to allow a write sequence, wherein the central processing unit issues a write command to the storage processing unit, the write command including a hash identifying a logical unit number of a particular one of a plurality of ethernet storage modules (ESMs) into which to write the digital data;
receiving the digital data in a write memory buffer that is coupled to the storage processing unit and is not coupled to the central processing unit;
writing the digital data, by the storage processing unit, from the write memory buffer to the particular one of the plurality of ESMs based upon the hash provided by the central processing unit;
at the particular ESM, writing the digital data into a persistent flash memory, including the steps of:
writing the digital data from the storage processing unit into a protected DRAM through an ESM processor coupled to the protected DRAM of the particular one of the plurality of ESMs;
issuing a command to the storage processing unit that the digital data has been completely written upon completion of the step of writing the digital data from the storage processing unit into the protected DRAM; and
writing the digital data from the protected DRAM into the persistent flash memory using the ESM processor, wherein the ESM processor associates a specific logical block address with the digital data that was written and maintains a table associating the specific logical block address with the digital data that was written.

12. The method according to claim 11 wherein the write memory buffer does not contain read digital data.

13. The method according to claim 11 wherein the hash is a 1 byte value.

14. A method of reading digital data from a storage array system to an external environment, the method comprising the steps of:
receiving a read request at the storage array system, the storage array system including a storage processing unit and a central processing unit;
determining, using the central processing unit, to allow a read sequence, wherein the central processing unit issues a read command to the storage processing unit, the write read command including a hash identifying a logical unit number of a particular one of a plurality of ethernet storage modules (ESMs) into which to read the digital data from;
issuing, from the storage processing unit, a particular read request to a particular one of a plurality of ESMs based upon the hash;
at the particular one of the plurality of ESMs, reading the digital data from a persistent flash memory, including the step of reading the digital data from a persistent flash memory using an ESM processor into a protected DRAM using a specific logical block address identifying the location where the digital data had been previously written;
reading the digital data from the protected DRAM, through the ESM processor and into a read buffer memory that is coupled to the storage processing unit and is not coupled to the central processing unit; and
reading the digital data from the buffer memory associated with the storage processing unit to the external environment.

15. The method according to claim 14 wherein the read memory buffer does not contain write digital data.

16. The method according to claim 14 wherein the hash is a 1 byte value.

* * * * *